United States Patent [19]

Angelini et al.

[11] 4,206,159
[45] Jun. 3, 1980

[54] ROD SCRUBBER

[75] Inventors: Edward J. Angelini, Westfield, Mass.; Khaldoun W. Malki, Granby, Conn.

[73] Assignee: Combustion Engineering, Inc., Windsor, Conn.

[21] Appl. No.: 1,337

[22] Filed: Jan. 5, 1979

[51] Int. Cl.$^2$ .............................................. B01F 3/04
[52] U.S. Cl. ..................... 261/62; 55/226; 261/109; 261/116; 261/DIG. 9; 261/DIG. 54
[58] Field of Search .............. 55/223, 226, 228, 240, 55/241; 261/44 R, 62, 109, 116, 117, 118, DIG. 9, DIG. 54, 115

[56] References Cited

U.S. PATENT DOCUMENTS

| | | | |
|---|---|---|---|
| 1,878,582 | 9/1932 | Hellmer | 261/116 |
| 3,218,047 | 11/1965 | Calaceto | 261/DIG. 54 |
| 3,544,087 | 12/1970 | McIlvaine | 261/109 X |
| 3,638,925 | 2/1972 | Braemer | 261/62 |
| 3,687,613 | 8/1972 | Rickard | 55/228 X |
| 3,730,499 | 5/1973 | Jonakin | 261/109 |
| 3,841,061 | 10/1974 | Pike | 261/DIG. 54 |
| 3,976,455 | 8/1976 | Dahlem | 261/44 R X |
| 4,007,025 | 2/1977 | Hegemann | 261/62 X |
| 4,012,469 | 3/1977 | Accortt | 261/117 |
| 4,047,891 | 9/1977 | Schuetz | 55/228 X |
| 4,064,202 | 12/1977 | Parenchuck | 261/44 R |

OTHER PUBLICATIONS 925711 05001963 GBX 261 DIG. 54

Primary Examiner—Richard L. Chiesa
Attorney, Agent, or Firm—Arthur E. Fournier, Jr.

[57] ABSTRACT

A venturi-type rod scrubber for effecting the cleaning of the flue gas produced as a by-product of the combustion process that occurs during the course of the operation of fossil fuel firing steam generators, before the flue gas flows up the exhaust stack and is released to the atmosphere. The subject scrubber includes inlet means through which the flue gas enters the scrubber. A first spray system is suitably mounted in juxtaposed relation to the inlet means so as to be operative to introduce liquid into the stream of flue gas entering the scrubber through the inlet means. In alignment with but in spaced relation to the inlet means, the scrubber is provided with a throat region, i.e., a region of restricted cross-section. A plurality of spaced rows of parallel rods are suitably mounted within the throat region so as to extend substantially perpendicular to the path of flow of the flue gas flowing therethrough. Interposed between the inlet means and the throat region, the scrubber is further provided with a second spray system that is also operative to introduce liquid into the flue gas stream. The first spray system and the second spray system mutually cooperate to effect an even distribution of liquid across the entire cross-sectional area of the throat region that is being traversed by the flue gas as the latter flows through the scrubber. This even distribution of liquid provides for an efficient removal of the particulate matter, entering the scrubber in entrainment with the flue gas. Concomitantly a reduction is achieved in the amount of particulate emission being released from the stack to the atmosphere.

3 Claims, 2 Drawing Figures

ROD SCRUBBER

BACKGROUND OF THE INVENTION

This invention relates to flue gas treatment devices, and more particularly, to a venturi-type rod scrubber for effecting the removal of particulate matter from flue gas in a sufficiently effective and efficient manner as to insure that the flue gas, which is being released, after treatment in the subject scrubber, to the atmosphere complies with the Environmental Protection Agency's proposed standards for particulate emissions.

Flue gas treatment devices are not unknown in the prior art. However, most of the effort, which has been directed towards the development of such devices, is of relatively recent vintage. More specifically, until the relatively recent adoption by federal, state, and local governments of standards regulating the amount of contaminants that can be released to the atmosphere, relatively little attention had been focused on the development of devices for treating flue gases to effect the removal therefrom of contaminants. Rather, generally speaking, the practice, which had enjoyed relatively widespread acceptance heretofore, had been one of simply permitting the flue gas, while still in an untreated state, to pass into the atmosphere. Now, the existence of such air-emission standards is having the effect of forcing the operators of emission producing equipment to either provide their equipment with air pollution control devices in an effort to comply with the standards, or else expose themselves to the possibility of incurring relatively severe penalties for failure to comply with these standards.

The issuance of governmental regulations concerning the extent to which air pollutants can be exhausted to the atmosphere has been motivated principally by the concern that exists regarding the harmful effects such pollutants can have on humans as well as the damage caused thereby to the environment. Two of the constituents commonly found to exist in flue gas, and which to-date have been the subject of attention in an effort to effect their elimination from flue gas are sulfur compounds and particulate matter. One of the reasons why the inclusion of sulfur dioxide in the flue gas is viewed as being undesirable is because a characteristic of sulfur dioxide is that it readily combines with water vapor and oxygen to form sulfuric acid, which is known to be capable of posing a hazard to humans as well as being known to have a damage-inducing effect on the environment.

Particulate matter, on the other hand, is unwanted for both health and aesthetic reasons. Namely, when particulate matter is allowed to be discharged into the atmosphere, it normally tends to fall to the ground producing a thin layer thereof that effectively covers everything with which it comes in contact. Although such a layer of particulate matter normally does not pose a serious threat to human health per se, though it is known to cause serious discomfort to those suffering from respiratory ailments, it is unsightly and does commonly occasion the necessity of effecting the more frequent repainting, cleaning, etc. of the exterior of building structures, etc. that have been covered with the layer of particulate matter.

The prior art contains a multiplicity of teachings of a variety of different types of devices that have been designed to be operative to effect the removal of contaminants from flue gas. One such type of device is that known in the prior art as a marble bed. For a description of the nature of the construction and the mode of operation of a prior art form of marble bed, reference may be had to U.S. Pat. No. 3,687,613—Rickard. As set forth therein, marble bed type scrubbers have been utilized primarily for the purpose of effecting the removal of sulfur compounds from flue gases. One major disadvantage, however, of the marble bed type of scrubber is that it has exhibited a susceptibility to becoming clogged in the course of operation, whereupon it loses its effectiveness as a flue gas treatment device.

Another type of device, which has been employed in the prior art to effect the removal of sulfur compounds from flue gases, is that commonly referred to as a spray tower. As known in the prior art, a spray tower comprises a tower in the form of a section of conduit, i.e. ductwork, through which flue gas is made to flow. During the course of its passage through the spray tower, a countercurrent spraying of the flue gas takes place. The effect of this spraying of the flue gas is to produce a washing of the particle-laden flue gas to free the latter from material particularly in the nature of sulfur compounds, that may be combined with the flue gas. Commonly, the spray is in the form of a slurry which contains an additive that has a known affinity for sulfur oxides.

Although spray towers have proven to be effective devices insofar as concerns the removal of sulfur oxides from the flue gas, there has nevertheless still existed a need for the flue gas to undergo additional treatment in order to effect the removal of particulate matter therefrom. One form of device that has been utilized by the prior art for this purpose is that known as a rod scrubber. As its name implies, a rod scrubber consists of a multiplicity of rods preferably arranged in a plurality of parallel layers, that are suitably disposed so as to extend substantially transverse to the path of flow of the flue gas. Normally, a spray means is cooperatively associated with the rods. The latter spray means is operative to discharge a liquid into the path of flow of the flue gas in the same direction as the flue gas is flowing. Reference may be had to U.S. Pat. No. 3,730,499—Jonakin for a teaching of the nature of the construction and the mode of operation of a prior art form of rod scrubber. In the aforesaid Jonakin patent, the rod scrubber is illustrated being employed in association with a device referred to as a demister. Basically, the function of a demister is to effect the separation from the gas stream of most of the fine water droplets that may remain entrained in the flue gas after the latter leaves the rod scrubber.

Notwithstanding the employment by the prior art of devices such as spray towers to effect the removal of sulfur compounds from the flue gas, rod scrubbers to effect the removal of particulate matter from the flue gas, and demisters to effect the separation of fine water droplets from the gas stream, it has nevertheless been found that the flue gas that is being exhausted from the stack to the atmosphere, following the passage thereof through such devices, still retains therein a measurable amount of contaminants. Furthermore, the pursuit of a reduction in the amount of contaminants still being released to the atmosphere with the flue gas has heretofore largely been deferred on the basis of simply representing a goal to be achieved at some future date. However, a change in attitude has been forthcoming in this regard more recently. A major impetus behind this attitudinal change has been the proposal by the Environmental Protection Agency of more stringent particulate emission requirements. Namely, although prior art flue gas treatment devices may have been effective in the past to meet the then prevailing air-emission standards, it is feared that such devices will no longer be adequate to effect the type of treatment of the flue gas that is required in order to comply with the new, and more restrictive standards that are being adopted at all levels of government.

Turning to a consideration solely of that of the subject of particulate removal, and more specifically the matter of the effectiveness of rod scrubbers in accomplishing the function of particulate removal, there are at least two major factors that merit attention as affecting the performance of any specific type of rod scrubber. These are the rate at which the liquid is sprayed into the gas stream, and the extent to which even distribution of the liquid in the gas stream is achieved. These two factors are important because they both affect the degree to which adequate liquid coverage is provided. In turn, the effectiveness and the efficiency with which a rod scrubber performs its function of particulate removal is predicated to a large extent on the degree to which adequate liquid coverage is present. Namely, for effective and efficient particulate removal, it is important that any dust particles that are entrained in the flue gas do become wetted and collected as the flue gas flows through the rod scrubber. That is, to achieve the desired particulate removal by the rod scrubber, it is essential that intimate contact be provided between the liquid and the entrained particles in order to effect the desired agglomeration of the particles and the liquid droplets concomitant with the engagement thereof with the surface of the rods as the flue gas traverses that portion of the rod scrubber, which is of reduced area and wherein the rods are to be found suitably mounted.

Reference may be had to U.S. Pat. No. 4,012,469—Accortt for a teaching of still another prior art form of rod scrubber. In accordance with the teachings of the aforesaid Accortt patent, at least some of the rods of the upper layer thereof in the rod scrubber are provided with openings through which a spraying of liquid countercurrent to the path of flow of the flue gas through the rod scrubber is effected. More specifically, the upper layer of rods is operative as a distribution conduit for the liquid that is introduced into the gas stream. However, although the rod scrubber, which comprises the subject matter of the aforesaid Accortt patent, provides for a complete distribution of liquid in a transverse direction across the throat portion of the rod scrubber, this type of rod scrubber nevertheless suffers from several disadvantages.

For example, in order to insure the existence of an adequate flow of liquid from each of the openings provided in the rods, it is necessary to impose a limitation on the size of the openings so that an adequate flow pressure of the liquid to each of the rod openings can be maintained. If the size of the rod openings were to be made relatively large, this would necessitate a concomitant increase in flow pressure to insure that an adequate rate of spray of liquid is being provided from each rod opening. Otherwise, the desired distribution of the liquid by the distribution conduit established through the provision of the openings in the upper layer of rods would not be achieved.

Secondly, by virtue of their relatively small size and the fact that they face in the direction of flow of the flue gas through the rod scrubber, the rod openings are susceptible to becoming clogged by agglomerations of dust particles and liquid. Namely, as some of these agglomerates traverse the throat region of the rod scrubber, they form deposits on the rods, and in doing so can occasion the blockage of the openings in the rods.

Thus, a need has been evidenced in the prior art for a flue gas treatment device having the capability to effectively and efficiently accomplish the removal from flue gas of the particulates entrained therein. Moreover, a need has been shown to exist to provide such a flue gas treatment device capable of removing a sufficient quantity of the particulates entrained in the flue gas such that compliance with the stringent particulate emission requirements of the Environmental Protection Agency is achieved. Finally, in the interest of accomplishing more effective and efficient particulate removal, a need has been demonstrated for a flue gas treatment device capable of providing improved liquid coverage to the contact surfaces engaged by the particulates in traversing the flue gas treatment device.

It is therefore an object of the present invention to provide a novel and improved flue gas treatment device operative for effecting the removal from flue gas of particulates entrained therein.

It is another object of the present invention to provide such a flue gas treatment device in the form of a venturi-type rod scrubber.

It is still another object of the present invention to provide such a venturi-type rod scrubber, which is characterized in its capability to insure that a proper volume of liquid is sprayed into the gas stream to effect the removal from the flue gas of particulates entrained therein in an effective and efficient manner.

A further object of the present invention is to provide such a venturi-type rod scrubber, which is characterized in its capability to provide an even distribution of liquid across the gas stream.

A still further object of the present invention is to provide such a venturi-type rod scrubber, which is characterized in its capability to provide adequate liquid coverage of the rod contact surfaces such that sufficient particulate removal is effected that compliance with the stringent particulate emission requirements of the Environmental Protection Agency is achieved.

Yet another object of the present invention is to provide such a venturi-type rod scrubber wherein the provision of the desired liquid coverage is accomplished through the utilization of mutually cooperative external and internal spray means.

Yet still another object of the present invention is to provide such a venturi-type rod scrubber that is readily compatible for use with existing power generation units from whence the particle-laden flue gas to be treated in the subject rod scrubber is derived.

SUMMARY OF THE INVENTION

In accordance with the present invention, there is provided a novel and improved venturi-type rod scrubber that is operative for effecting the removal of particulates from the flue gas, which is produced as a by-product of the combustion process that occurs during the operation of fossil fuel firing steam generators. The subject rod scrubber embodies an inlet, which communicates fluidically with the steam generator and through which the particle-laden flue gas enters the rod scrubber. An external spray system is suitably mounted on the rod scrubber in juxtaposed relation to the inlet whereby liquid is introduced into the gas stream from the external spray system. Preferably, the external spray system includes a plurality of 45 degree fan nozzles that are suitably positioned relative to the side walls of the rod scrubber so that the sprays therefrom intersect centrally of the interior of the rod scrubbers and so that the sprays are operative to effect a washing of the inner surfaces of the side wall portions of the rod scrubber. In spaced relation and in alignment with the inlet, the scrubber has formed therein a throat region, i.e., a region of reduced cross-section. A pair of suitably spaced layers, i.e., rows of rods, are mounted within the throat region so as to extend substantially perpendicular to the path of flow of the flue gas therethrough. The rod scrubber is further provided with an internal spray system that is suitably mounted within the rod scrubber so as to be in alignment with but spaced downstream of the inlet of the scrubber and upstream of the rods. The internal spray system also is operative to introduce liquid into the gas stream. The external spray system and the internal spray system mutually cooperate to provide the proper rate of spray of the liquid into the gas stream and to effect an even distribution of liquid across the gas stream whereby adequate liquid coverage of the rod contact surfaces is achieved. Thus, by virtue of the provision of this adequate liquid coverage an effective and efficient removal of particulate matter from the flue gas, sufficient to comply with the stringent particulate emission requirements of the Environmental Protection Agency is accomplished through the use of the subject rod scrubber.

DESCRIPTION OF A PREFERRED EMBODIMENT

Figure 1:
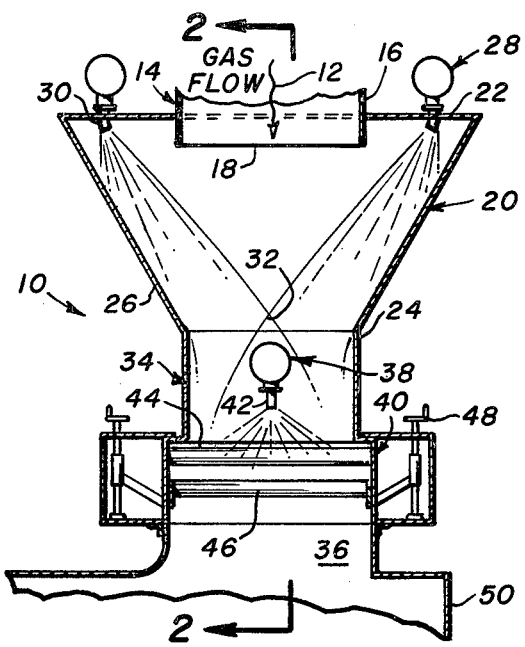
FIG. 1 is a side elevational view of a venturi-type rod scrubber constructed in accordance with the present invention.

Referring to the drawing, and more particularly to FIG. 1 thereof, there is illustrated therein a venturi-type rod scrubber, generally designated by reference numeral 10, constructed in accordance with the present invention. The rod scrubber 10 is operative as a flue gas treatment device to effect the removal of particulates from particle-laden flue gas. Accordingly, although not apparent from the drawing, the rod scrubber 10 commonly would be installed intermediate a fossil fuel firing steam generator (not shown) which is a producer of the particle-laden flue gas, and an exhaust stack (not shown) from which the particle-laden flue gas after having undergone treatment in the rod scrubber 10 to effect the removal of particulate matter therefrom is ultimately released to the atmosphere. As such, the rod scrubber 10 is designed to be connected in fluid flow relation with both the fossil fuel firing steam generator (not shown) and the exhaust stack (not shown). Moreover, this interconnection of the rod scrubber 10 with the steam generator (not shown) and the exhaust stack (not shown) is accomplished in such a manner that the particle-laden flue gas preferably flows in a vertically downwardly path through the rod scrubber 10, i.e., the direction of flue gas flow through the rod scrubber 10 is that denoted by the arrow bearing the reference numeral 12 in FIG. 1 of the drawing.

Figure 2:
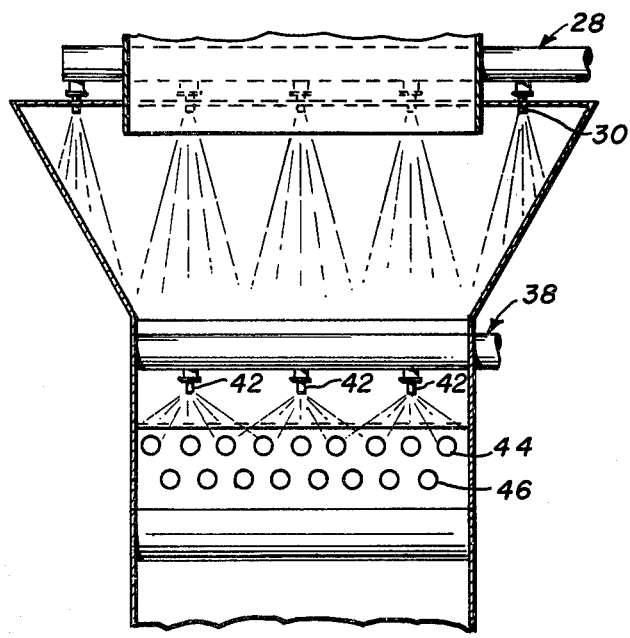
FIG. 2 is a cross-sectional view of a venturi-type rod scrubber constructed in accordance with the present invention, taken substantially along the line 2—2 in FIG. 1.

As depicted in FIGS. 1 and 2 of the drawing, the rod scrubber 10 is provided with inlet means 14 through which the particle-laden flue gas enters the former. The inlet means 14 comprises a length of conduit, i.e., ductwork, of generally rectangular cross-section having one end 16 thereof that is designed to be connected in fluid flow relation with a source (not shown) of particle-laden flue gas, and the other end 18 thereof connected in fluid flow relation with the housing 20 of the rod scrubber 10. The configuration of the housing 20 substantially resembles that of an inverted pyramid having a truncated base. Namely, the top portion 22 of the housing 20 as viewed with reference to FIG. 1, is substantially rectangular in cross-section and is larger in dimension than is the base portion 24 of the housing 20, which is also substantially rectangular in cross-section. The top portion 22 and the base portion 24 of the housing 20 are interconnected by means of inwardly sloping side walls 26 that are substantially planar in configuration. The top portion 22 of the housing 20 is provided with a suitably dimensioned opening located at the approximate center thereof for receiving the end 18 of the inlet means 14 therein. The end 18 of the inlet means 14 is suitably secured such as by being welded thereto to the top portion 22 of the housing 20 in such a manner that the end 18 preferably projects to a slight extent into the interior of the housing 20. This is done principally to insure that all of the particle-laden flue gas, which enters the inlet means 14 passes therefrom into the interior of the housing 20.

Continuing with a description of the nature of the construction of the rod scrubber 10, the latter is provided with an external spray system, generally designated by reference numeral 28, which is operative to effect the introduction of liquid into the stream of flue gas flowing into and through the interior of the housing 20. More specifically, the external spray system 28 includes a plurality of nozzles 30 that are suitably mounted, through the use of any suitable conventional form of mounting means (not shown), on the top portion 22 of the housing 20. Namely, as will be best understood with reference to FIG. 1 of the drawing, the external spray system 28 is suitably mounted externally of the housing 20 in such a manner that at least the discharge ports of the nozzles 30 project within the interior of the housing 20. Preferably, the nozzles 30 each comprise a 45 degree fan nozzle. Moreover, the nozzles 30 are suitably positioned relative to the inlet means 14 such that the sprays being discharged therefrom intersect in an area, designated in FIG. 1 of the drawing by reference numeral 32, which lies in a plane coincident with a plane defined by the center line of the inlet means 14, and such that the sprays from the nozzles 30 are capable of effecting a washing with liquid of the inner surfaces of the side walls 26 of the housing 20. Although not depicted in the drawing, it is nevertheless to be understood that the external spray system 28 is suitably connected through the use of any suitable conventional form of connecting means to a supply (not shown) of liquid from whence liquid is fed to the nozzles 30 for discharge therefrom.

Referring again to FIGS. 1 and 2 of the drawing, the rod scrubber 10 further includes a throat portion, generally designated by reference numeral 34. The latter throat portion 34 comprises a restrictive area of reduced dimension, which is generally rectangular in cross-section. Namely, the cross-sectional area of the throat portion 34 is substantially equivalent in size to that of the inlet means 14. Moreover, the throat portion 34 is suitably located relative to the inlet means 14 so as to be vertically aligned therewith, as viewed with reference to FIG. 1, but spaced therefrom. That is, the throat portion 34 extends from the base portion 24 of the housing 20 and is suitably connected in fluid flow relation therewith. In addition, as will be more fully described hereinafter, the flue gas after passing through the throat portion 34 is exhausted from the rod scrubber 10 through outlet means 36, the latter being in fluid communication with the throat portion 34.

Basically, it is in the throat portion 34 of the rod scrubber 10 that the actual removal of particulate matter from the particle-laden flue gas is effected. To this end, the throat portion 34 of the rod scrubber 10 has supported therein an internal spray system and rod means, generally designated by reference numerals 38 and 40, respectively. The internal spray system 38, like the external spray system 28, also is operative to effect the introduction of liquid into the stream of flue gas entering the housing 20 through the inlet means 14. The internal spray system 38 includes a plurality of nozzles 42 which in accordance with the preferred embodiment of the invention each comprises a nozzle of the full cone type that is operable to discharge a full cone of spray therefrom. As best understood with reference to FIG. 1 of the drawing, the internal spray system 38 is suitably mounted through the use of any suitable conventional form of mounting means (not shown), adjacent to the throat portion 34 so as to be positioned at a point located in a plane defined by the center line of the inlet means 14. The positioning of the internal spray system 38 is relatively critical inasmuch as for purposes of achieving effective and efficient particulate removal, it is important that the internal spray system 38 be suitably located so that it will be wetted by liquid being discharged from the nozzles 30 of the external spray system 28. This is to preclude the occurrence of a wet/dry interface deposit buildup thereon. The presence of such a buildup is known to have an adverse effect on the performance of the particulate removal function. Although not illustrated in the drawing, it is nevertheless to be understood that the internal spray system 38 is suitably connected, through the use of suitable conventional fluid connection means, to a source (not shown) of liquid from whence liquid is fed to the nozzles 42. The external spray system 28 and the internal spray system 38 mutually cooperate to provide the proper rate of spray of liquid into the stream of flue gas flowing through the rod scrubber 10 and also to achieve an even distribution of liquid across the gas stream, thereby insuring that both the requisite liquid volume and the requisite even distribution of liquid that is needed to effect the desired wetting of the particles in the flue gas in order to accomplish the particulate removal function exists.

Completing the description of the nature of the construction of the rod scrubber 10, the rod means 40 in accordance with the preferred embodiment of the invention and as depicted in FIG. 1 comprises a pair of vertically spaced layers 44 and 46 of rods. Each of the layers 44 and 46 of rods consists of a plurality of individual rods, which as best understood with reference to FIG. 2 of the drawing are suitably spaced one from another in a horizontal plane. The rod means 40 is suitably mounted, through the use of any suitable conventional form of mounting means (not shown), in the throat portion 34 so as to extend substantially perpendicular to the path of flow of the flue gas through the throat portion 34. Preferably, the rod means 40 embodies adjustment means 48 operative to adjust the vertical spacing between the rod layer 44 and the rod layer 46. The adjustment means 48 may take the form of the means described and illustrated in U.S. Pat. No. 4,012,469—Accortt for effecting adjustments between the layers of rods embodied in the rod scrubber, which forms the subject matter of the aforesaid Accortt patent.

As mentioned previously hereinabove, the flue gas exits from the throat portion 34 through outlet means 36. The latter outlet means 36 preferably communicates fluidically with a reaction tank, generally designated by reference numeral 50 in the drawing. The function of the reaction tank 50 is to receive the particulates being removed from the flue gas as the latter is passed through the rod scrubber 10. Inasmuch as the mode of operation and the nature of the construction of reaction tanks is well-known to those skilled in the art, it is not deemed necessary to include herein a more detailed description thereof. Rather, reference may be had, if deemed necessary, to the aforesaid Accortt patent for a prior art teaching of a reaction tank suitable for use in association with the rod scrubber 10 of the present invention.

Considering next the mode of operation of the rod scrubber 10, as stated previously hereinabove the rod scrubber 10 is designed to be installed in the path of flow of the flue gas from the steam generator (not shown) to the exhaust stack (not shown). As such, the particle-laden flue gas produced in the steam generator (not shown) is made to pass through the rod scrubber 10 entering the latter through the inlet means 14, before the flue gas is permitted to be released to the atmosphere from the exhaust stack (not shown). Upon entering the housing 20 of the rod scrubber 10 from the inlet means 14 thereof, liquid is introduced into the gas stream by means of the external spray system 28. As the flue gas continues its passage through the housing 20, further liquid is introduced into the gas stream by means of the internal spray system 38. As a consequence of the mutually cooperative action of the external spray system 28 and the internal spray system 38, the desired wetting of the particulate matter entrained in the flue gas is effected upstream of the rod means 40. The wetted particles are next collected as they traverse the rod means 40. Namely, from the housing 20 the flue gas with the particles entrained therein now having been wetted enter the throat portion 34 f the rod scrubber 10, and as they pass between the layers 44 and 46 of rods are collected. More specifically, an agglomeration action accompanied by a separation of the particles from the gas stream occurs as the flue gas traverses this region, i.e., the throat portion 34 of the rod scrubber 10. The separated particles, upon dropping out of the gas stream, fall into the reaction tank 50 from whence they are subsequently recoverable.

The rod scrubber 10 is operative to remove dust particles from flue gas by the impaction thereof with the rods of layers 44 and 46 located in the throat portion 34. To accomplish this removal of dust particles from the flue gas effectively and efficiently, it is necessary to insure that the gas stream embodies no holes devoid of liquid, which could allow particulates to pass through unwetted and therefore uncollected. Furthermore, it is important for the same reason that no wet/dry interface deposit buildup occur on the rods themselves. However, the rod scrubber 10 by providing increased liquid and improved liquid distribution in the gas stream insures that the above mentioned problems do not arise. In addition, with the rod scrubber 10, it is possible to employ a throat portion which is of increased dimension, i.e., a five foot width rather than the three foot width commonly employed in prior art rod scrubbers, without concern that the liquid coverage on the rods will be inadequate due to the increased dimension or that an uneven distribution of liquid stemming from inadequate spray deflection caused by the influence of gravity and of high gas velocity will occur. The cooperative spraying effect produced by the external spray system 28 combine with the internal spray system 38 not only insures that adequate liquid is introduced into the gas stream and that the liquid is evenly distributed therethrough but also is effective in accomplishing a washing of the side walls 26 of the housing 20 and in providing adequate liquid coverage to the ends of the rods of the layers 44 and 46 thereof.

Thus, in accordance with the present invention there has been provided a novel and improved flue gas treatment device operative for effecting the removal from flue gas of particulates entrained therein. Moreover, the subject flue gas treatment device comprises a venturi-type rod scrubber. In addition, in accord with the present invention a venturi-type rod scrubber is provided that is characterized in its capability to insure that a proper volume of liquid is sprayed into the gas stream to effect the removal from the flue gas of particulates entrained therein in an effective and efficient manner. Further, the venturi-type rod scrubber of the present invention is characterized in its capability to provide an even distribution of liquid across the gas stream. Additionally, in accordance with the present invention a venturi-type rod scrubber is provided, which is characterized in its capability to provide adequate liquid coverage of the rod contact surface, such that sufficient particulate removal is effected that compliance with the stringent particulate emission requirements of the Environmental Protection Agency is achieved. Moreover, in the venturi-type rod scrubber of the present invention the provision of the desired liquid coverage is accomplished through the employment of mutually cooperative external and internal spray systems. Finally, in accord with the present invention a venturi-type rod scrubber is provided that is readily compatible for use with existing power generation units from whence the particle-laden flue gas is to be treated in the subject rod scrubber is derived.

While only one embodiment of our invention has been shown, it will be appreciated that modifications thereof, some of which have been alluded to hereinabove, may readily be made thereto by those skilled in the art. We, therefore, intend by the appended claims to cover the modifications alluded to herein as well as all other modifications, which fall within the true spirit and scope of our invention.

What is claimed is:

1. A rod scrubber operable to effect the removal of particulates from a stream of flue gas, particularly flue gas of the type produced during the operation of a fossil fuel fired steam generation unit, comprising:

a. a body having an inlet end and an outlet end, said inlet end possessing a greater cross sectional area than said outlet end, said body including a top wall and a plurality of interconnected inwardly sloping side walls, each of said plurality of interconnected inwardly sloping side walls having one end thereof joined to said top wall so as to provide said body with the configuration of an inverted pyramid having a truncated base, said inlet end of said body being defined by said top wall thereof, said outlet end of said body being defined by the other end of each of said plurality of interconnected inwardly sloping side walls;

b. inlet means cooperatively associated with said top wall of said body, said inlet means comprising a conduit having one end thereof connectable to a source of flue gas and the other end thereof projecting into the interior of said body through said top wall thereof, said conduit being axially aligned with said outlet end of said body and having a cross section corresponding to the cross section of said outlet end of said body, said conduit being operative to provide for the entrance of a stream of flue gas into the interior of said body;

c. throat means cooperatively associated with said outlet end of said body so as to be connected in fluid flow relation with said inlet means for receiving the stream of flue gas from said inlet means, said throat means being joined to said other end of said plurality of interconnected inwardly sloping side walls of said body, said throat means comprising an area of reduced cross section aligned with but spaced from said inlet means, said throat means having a cross section corresponding to the cross section of said outlet end of said body;

d. rod means m ounted in said throat means, said rod means including a pair of spaced layers of rods extending substantially perpendicular to the path of flow of the stream of flue gas through said throat means, said rod means further including adjustment means operative for adjusting the spacing between said pair of spaced layers of rods, each of said pair of spaced layers of rods including a plurality of individual rods extending in spaced parallel relation one to another;

e. first spray means supported on said body in juxtaposed relation to said inlet means, said first spray means including first nozzle means and second nozzle means, said first and second nozzle means each being supported externally of said body on said top wall thereof, said first and second nozzle means each including a plurality of nozzles, each of said plurality of nozzles of said first and second nozzle means including a portion that projects into the interior of said body through said top wall thereof, said first nozzle means being located in spaced relation to a first portion of said inlet means, said second nozzle means being located in spaced relation to a second portion of said inlet means, said first nozzle means and said second nozzle means each being operative to discharge a spray of liquid therefrom in such a manner that the spray of liquid being discharged from said first nozzle means intersects with the spray of liquid being discharged from said second nozzle means in an area located centrally within the interior of said body downstream of but axially aligned with said end of said conduit that projects into the interior of said body and upstream of the joinder of said throat means with said other end of said plurality of interconnected inwardly sloping side walls of said body, said first and second nozzle means through the cooperative discharge of liquid therefrom being operative both to effect the introduction of liquid into the stream of flue gas exiting into the interior of said body from said inlet means for purposes of removing from the stream of flue gas the particulates contained therein and to effect a washing of said plurality of interconnected inwardly sloping side walls of said body as well as a washing of the portion of said throat means located upstream of said rod means;

f. second spray means supported within said throat means upstream of said rod means, said second spray means including at least one nozzle located at a position immediately adjacent to but downstream of the area whereat the sprays of liquid from said first and second nozzle means intersect such that said one nozzle of said second spray means is wetted by the sprays of liquid being discharged from said first and second nozzle means so as to preclude the occurrence of a wet/dry interface deposit buildup on said one nozzle of said second spray means, said second spray means being operative to introduce liquid into the stream of flue gas in addition to the liquid being introduced into the stream of flue gas from said first spray means, said second spray means cooperating with said first spray means both to provide the proper rate of spray of liquid into the stream of flue gas and to achieve an even distribution of this liquid throughout the stream of flue gas so as to thereby prevent the occurrence in the stream of flue gas of any holes that are devoid of liquid and concomitantly to effect the wetting of the particulates contained in the stream of flue gas that is needed to accomplish the removal of these particulates from the entire stream of flue gas; and g. outlet means cooperatively associated with the other end of said throat means so as to receive the stream of flue gas exiting therefrom, said outlet means having one end thereof connected to said throat means downstream of said rod means and being operable to effect the discharge from the rod scrubber of the stream of flue gas after particulates have been removed therefrom during the course of the passage thereof through the rod scrubber.

2. The rod scrubber as set forth in claim 1 wherein each of said plurality of nozzles comprises a 45 degree fan nozzle.

3. The rod scrubber as set forth in claim 1 wherein said at least one nozzle comprises a full cone nozzle of said second spray means.

* * * * *